US012632788B2

(12) United States Patent
Varshney et al.

(10) Patent No.: US 12,632,788 B2
(45) Date of Patent: May 19, 2026

(54) PROMPT AUGMENTED GENERATIVE REPLAY VIA SUPERVISED CONTRASTIVE TRAINING FOR LIFELONG INTENT DETECTION

(71) Applicant: Tata Consultancy Services Limited, Mumbai (IN)

(72) Inventors: Vaibhav Varshney, Noida (IN); Mayur Patidar, Noida (IN); Rajat Kumar, Noida (IN); Gautam Shroff, Noida (IN); Lovekesh Vig, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 318 days.

(21) Appl. No.: 18/215,972

(22) Filed: Jun. 29, 2023

(65) Prior Publication Data

US 2024/0013094 A1     Jan. 11, 2024

(30) Foreign Application Priority Data

Jul. 7, 2022     (IN) ............................. 202221039196

(51) Int. Cl.
| | |
|---|---|
| *G06F 40/40* | (2020.01) |
| *G06F 40/284* | (2020.01) |
| *G06F 40/35* | (2020.01) |
| *G06N 20/00* | (2019.01) |

(52) U.S. Cl.
CPC ........... *G06N 20/00* (2019.01); *G06F 40/284* (2020.01); *G06F 40/35* (2020.01); *G06F 40/40* (2020.01)

(58) Field of Classification Search
None
See application file for complete search history.

(56) References Cited

U.S. PATENT DOCUMENTS 11,995,048 B2 * 5/2024 Zhao .................... G06F 16/213
2021/0383158 A1 12/2021 Shim et al.

OTHER PUBLICATIONS

Ke et al. "Continual Learning of Natural Language Processing Tasks: A Survey" University of Illinois at Chicago Nov. 23, 2022 (Year: 2022).*

(Continued)

*Primary Examiner* — Pierre Louis Desir
(74) *Attorney, Agent, or Firm* — Finnegan, Henderson, Farabow, Garrett & Dunner, LLP

(57) ABSTRACT

Embodiments disclosed herein model lifelong intent detection as a class-incremental learning where a new set of intents/classes are added at each incremental step. To address the issue of catastrophic forgetting during lifelong intent detection (LID), an incremental learner is provided with Prompt Augmented Generative Replay, wherein unlike existing approaches that store real samples in replay memory, only concept words obtained from old intents are stored, which reduces memory consumption and speeds up incremental training still enabling not forgetting the old intents. Joint training of an incremental learner is carried out for LID and a pseudo-labeled utterance generation with objective is to classify a user utterance into one of multiple pre-defined intents by minimizing a total Loss function comprising a LID loss function, a Labeled Utterance Generation loss function, a Supervised Contrastive Training loss function, and a Knowledge Distillation loss function.

12 Claims, 9 Drawing Sheets

300 performing a joint training of an incremental learner implemented via the one or more hardware processors, to obtain a trained incremental learner for LID and a pseudo labeled utterance generation, wherein a LID problem is modeled as a class Incremental Learning problem, and wherein a training objective is to classify a user utterance into one of multiple pre-defined intents by minimizing a total Loss function comprising an intent detection loss function, a Labelled Utterance Generation loss function, a Supervised Contrastive Training loss function and a Knowledge Distillation loss function — 302 generating, by the trained incremental learner of a previous instance, a current set of pseudo labeled utterances — 304 receiving, at a current instance, labeled data corresponding to new input intents — 306 iterating the joint training the trained incremental learner of previous instance using the current set of pseudo labeled utterances and the current instance labeled data corresponding to new input intents to generate a trained incremental learner for current instance — 308 identifying a current plurality of concept words from the current instance labeled data corresponding to new input intents and storing them in a replay memory for generation of the pseudo labeled utterances in successive joint training of incremental learner — 310

(56) References Cited

OTHER PUBLICATIONS

Liu et al. "Lifelong Intent Detection via Multi-Strategy Rebalancing" ACM at CIKM '21 Queensland, Australia Aug. 10, 2021 (Year: 2021).*

Qin et al. "LFPT5: A Unified Framework For Lifelong Few-Shot Language Learning Based On Prompt Tuning Of T5" ICLR 2022/ Saleforce Research Mar. 31, 2022 (Year: 2022).*

Deng et al., "Incremental Prototype Prompt-tuning with Pre-trained Representation for Class Incremental Learning," (2022).

Shen et al., "Bypassing Logits Bias in Online Class-Incremental Learning with a Generative Framework," (2022).

Wang et al., "Learning to Prompt for Continual Learning," (2022).

Zhang et al., "Few-Shot Intent Detection via Contrastive Pre-Training and Fine-Tuning," (2021).

* cited by examiner

300 performing a joint training of an incremental learner implemented via the one or more hardware processors, to obtain a trained incremental learner for LID and a pseudo labeled utterance generation, wherein a LID problem is modeled as a class Incremental Learning problem, and wherein a training objective is to classify a user utterance into one of multiple pre-defined intents by minimizing a total Loss function comprising an intent detection loss function, a Labelled Utterance Generation loss function, a Supervised Contrastive Training loss function and a Knowledge Distillation loss function ⟋ 302 generating, by the trained incremental learner of a previous instance, a current set of pseudo labeled utterances ⟋ 304 receiving, at a current instance, labeled data corresponding to new input intents ⟋ 306 iterating the joint training the trained incremental learner of previous instance using the current set of pseudo labeled utterances and the current instance labeled data corresponding to new input intents to generate a trained incremental learner for current instance ⟋ 308 identifying a current plurality of concept words from the current instance labeled data corresponding to new input intents and storing them in a replay memory for generation of the pseudo labeled utterances in successive joint training of incremental learner ⟋ 310

FIG. 3

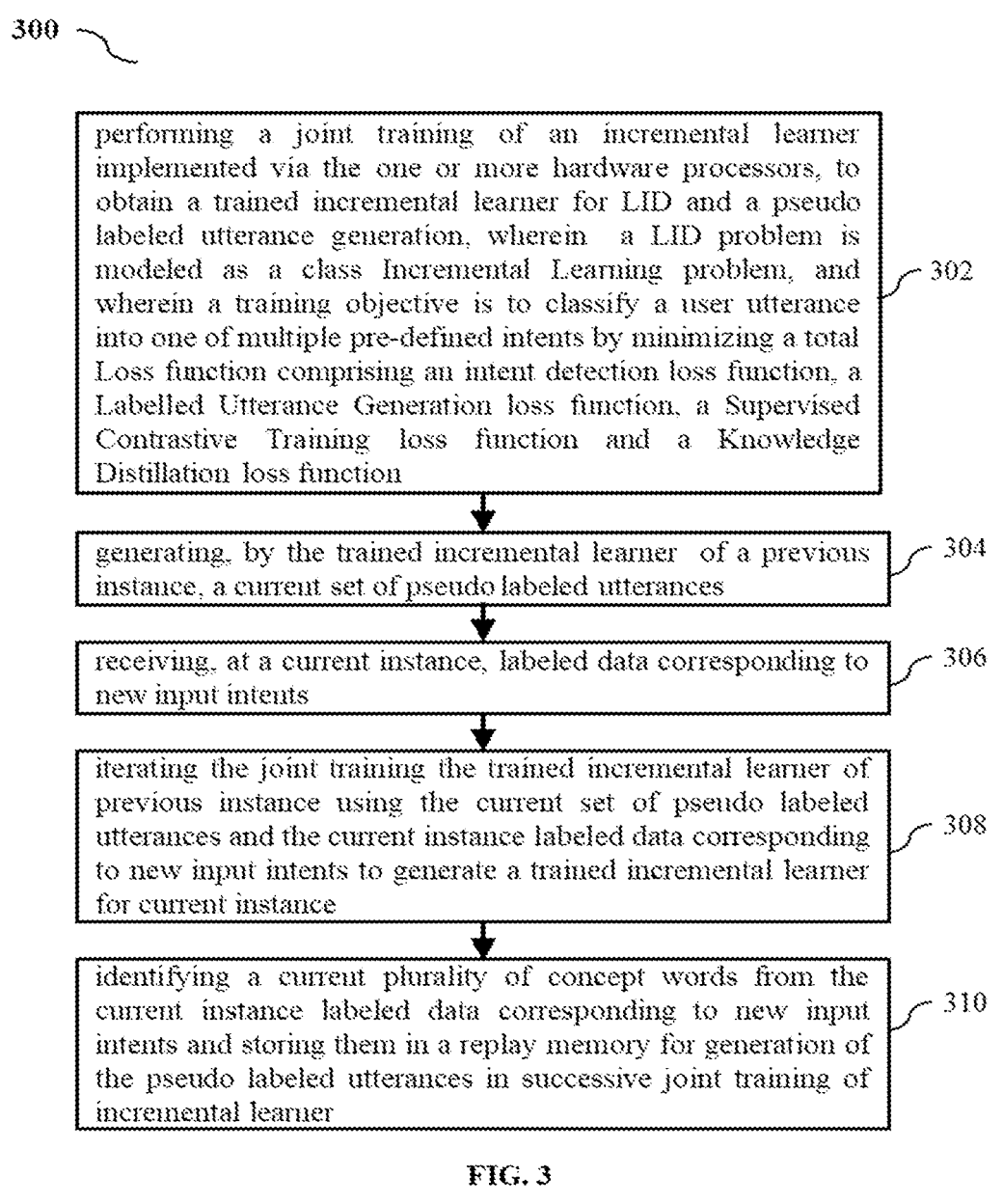

(A) Prompt without a question (PWQ)

(B) Prompt with an incremental question (PWIQ)

(C) Prompt for Labelled Utterance Generation (LUG)

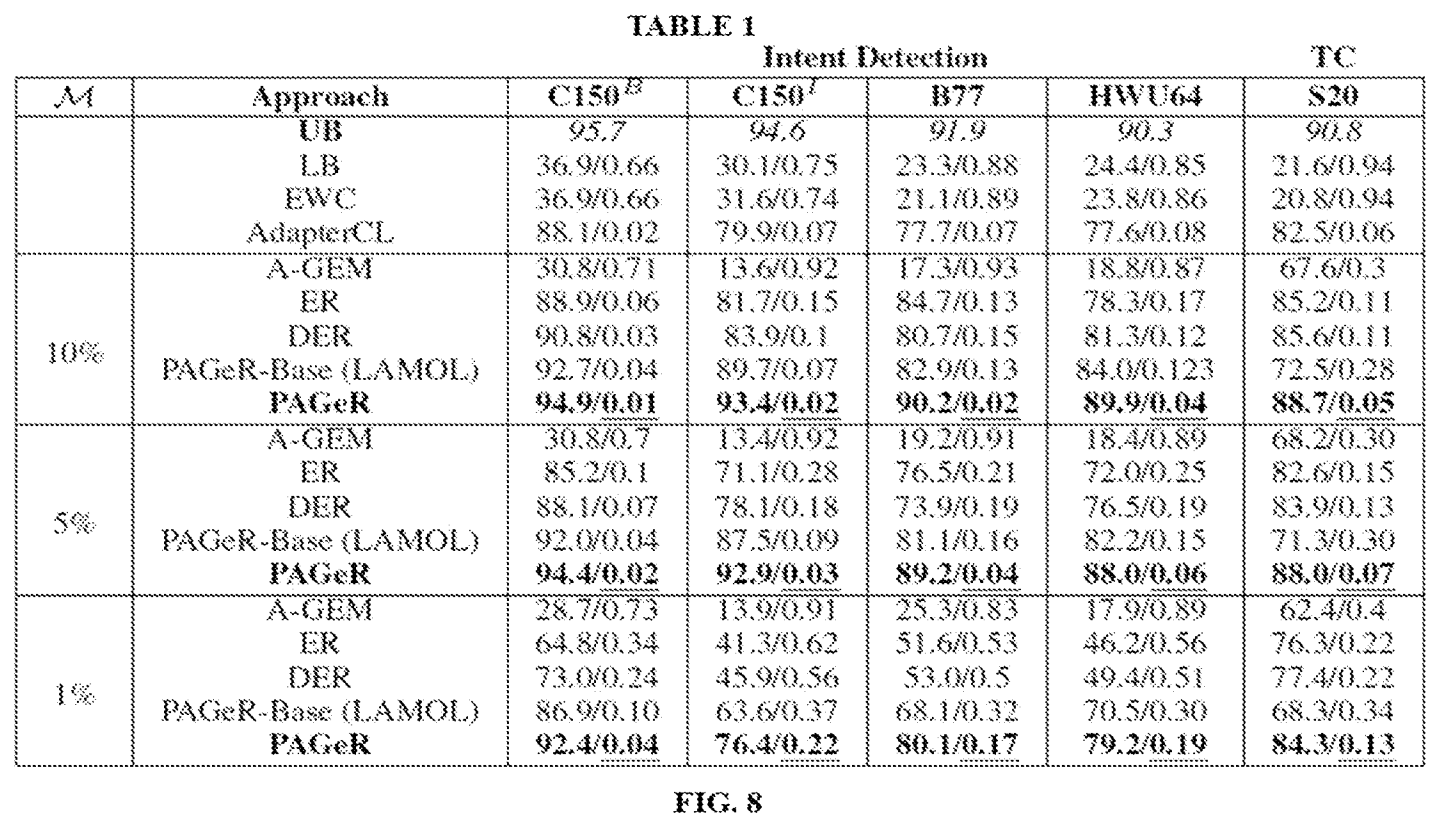

TABLE 1

| M | Approach | Intent Detection | | | | | TC |
| | | C150^B (95.7) | C150^J (94.6) | B77 (97.9) | HWU64 (90.3) | S20 (90.8) |
|---|---|---|---|---|---|---|
| | UB | 36.9/0.66 | 30.1/0.75 | 23.5/0.88 | 24.4/0.85 | 21.6/0.94 |
| | LB | 36.9/0.66 | 31.6/0.74 | 21.1/0.89 | 23.8/0.86 | 20.8/0.94 |
| | EWC | 88.1/0.02 | 79.9/0.07 | 77.7/0.07 | 77.6/0.08 | 82.5/0.06 |
| | AdapterCL | 30.8/0.71 | 13.6/0.92 | 17.3/0.93 | 18.8/0.87 | 67.6/0.3 |
| 10% | A-GEM | 88.9/0.06 | 81.7/0.15 | 84.7/0.13 | 78.3/0.17 | 85.2/0.11 |
| | ER | 90.8/0.03 | 83.9/0.1 | 80.7/0.15 | 81.3/0.12 | 85.6/0.11 |
| | DER | 92.7/0.04 | 89.7/0.07 | 82.9/0.13 | 84.0/0.123 | 72.5/0.28 |
| | PAGeR-Base (LAMOL) | 94.9/0.01 | 92.9/0.03 | 90.2/0.02 | 89.9/0.04 | 88.7/0.05 |
| | PAGeR | 94.9/0.01 | 93.4/0.02 | 90.2/0.02 | 89.9/0.04 | 88.7/0.05 |
| 5% | A-GEM | 30.8/0.7 | 13.4/0.92 | 19.2/0.91 | 18.4/0.89 | 68.2/0.30 |
| | ER | 85.2/0.1 | 71.1/0.28 | 76.5/0.21 | 72.0/0.25 | 82.6/0.15 |
| | DER | 88.1/0.07 | 78.1/0.18 | 73.9/0.19 | 76.5/0.19 | 83.9/0.13 |
| | PAGeR-Base (LAMOL) | 92.0/0.04 | 87.5/0.09 | 81.1/0.16 | 82.2/0.15 | 71.3/0.30 |
| | PAGeR | 94.4/0.02 | 92.9/0.03 | 89.2/0.04 | 88.0/0.06 | 88.0/0.07 |
| 1% | A-GEM | 28.7/0.73 | 13.9/0.91 | 25.3/0.83 | 17.9/0.89 | 62.4/0.4 |
| | ER | 64.8/0.34 | 41.3/0.62 | 51.6/0.53 | 46.2/0.56 | 76.3/0.22 |
| | DER | 73.0/0.24 | 45.9/0.56 | 53.0/0.5 | 49.4/0.51 | 77.4/0.22 |
| | PAGeR-Base (LAMOL) | 86.9/0.10 | 63.6/0.37 | 68.1/0.33 | 70.5/0.30 | 68.3/0.34 |
| | PAGeR | 92.4/0.04 | 76.4/0.22 | 80.1/0.17 | 79.2/0.19 | 84.3/0.13 |

FIG. 8

PROMPT AUGMENTED GENERATIVE REPLAY VIA SUPERVISED CONTRASTIVE TRAINING FOR LIFELONG INTENT DETECTION

PRIORITY CLAIM

This U.S. patent application claims priority under 35 U.S.C. § 119 to: Indian Patent Application No. 202221039196, filed on 7 Jul. 2022. The entire contents of the aforementioned application are incorporated herein by reference.

TECHNICAL FIELD

The embodiments herein generally relate to the field of life long intent detection (LID) and, more particularly, to a method and system for prompt augmented generative replay via supervised contrastive training for LID.

BACKGROUND

Modern dialog systems are reliant on user intent detection wherein the system is required to classify. a user utterance into one of multiple pre-defined intents. A static intent detection model is often insufficient for real-world applications because user intents evolve over time, additional functionality may be added to the system and some intents may become obsolete. Consider a conversational Information Technology (IT) helpdesk in an enterprise, where a ticket raised by an employee is classified into one of the multiple pre-defined intents (corresponding to different IT complaints) and accordingly routed by the system to the appropriate IT support staff. Each ticket comprises a textual IT problem description manually entered by an employee in natural language. In a typical IT enterprise, the helpdesk team provides support for every IT application from installation to maintenance. As applications get upgraded, and newer applications are introduced, the set of intents can change, and the intent detection model must be updated. In the above example, the intent detection model is required to classify both old and newly introduced intents after updating. However, privacy concerns may limit access to prior intent data, and even if prior data is available, retraining the intent detection model from scratch becomes computationally expensive due to the ever-increasing data volume. An additional problem is that the data is skewed towards prior intents.

Recently, been a lot of emphasis on continual learning to address these issues for computer vision and natural language processing, wherein the objective is to train a model on a sequence of novel tasks while maintaining performance on prior learned tasks, i.e., to prevent catastrophic forgetting with little or no data from old tasks. Works in literature have formulated multiclass-text classification as a task-incremental learning (Task-IL) problem where the objective is to train an 'incremental learner' on a sequence of tasks. Here each classification task from a novel domain is treated as a separate task introduced at each incremental step. Further, it is assumed that each task definition is complete, i.e., for each classification task access is available to all possible class labels and the set of class labels for that task remains immutable. However, in real-world applications, a task itself may evolve over time, where, for an intent detection task in the banking domain a new set of intents are added at each incremental step based on new user needs and new functionality introduced by the service provider.

Also, in Task-IL, the task identity is provided at inference time, i.e., "Which task has to be performed for a given utterance?" This restricts the job of the "task incremental learner" to choosing one of the task-specific classes as a response. This is in contrast to lifelong intent detection, where the incremental learner has to consider the complete set of intents that have been added so far, independent of the number of incremental steps.

To overcome catastrophic forgetting in Task-IL, a recent work LAnguage MOdeling for Lifelong Language Learning (LAMOL) uses a pretrained Language Models (PLM) as the task incremental learner and uses the same learner for generative replay, i.e., for generating samples of old tasks in Task-IL. Another existing method proposes a residual adapter based architecture for lifelong intent detection in task oriented dialogue systems. Unlike other existing Task-IL approaches, the above approach predicts task-id, i.e., which adapter to use at test time by using an entropy-based classifier. Similar to LAMOL, they also model lifelong intent detection as Task-IL where dialogues from new domains are added to the system over a period of time. However, the task-specific adapters are trained in isolation which often results in erroneous task-id predictions due to an overlap between the intents introduced over different incremental steps. In one of other works a novel strategy based on exemplar-replay (MSR) which tries to perform knowledge distillation at prediction level and feature level and uses inter-class margin loss to minimize distance between new and old class embeddings.

Thus, task based incremental learner for life long intent detection has challenges as mentioned above. One of the works in literature proposes three problem scenarios of increasing difficulty for evaluating continual learning algorithms based on whether the task identity is known or not and if not known whether it has to be predicted at inference time or not. The three scenarios correspond to (i) Task Incremental Learning (Task-IL) (ii) Domain-incremental learning (Domain-IL) and (iii) Class-incremental learning (Class-IL) respectively. Among these three scenarios, Class-IL is the most challenging whereas Task-IL is comparatively the easiest.

One of the interesting and researched approaches areas is based on generative replay and prompt based PLMs. One of the literature uses a Generative Replay based method proposes an approach for TASK-IL where they generate pseudo-labeled samples corresponding to old tasks for replay and use the same model for generating a label given a sample and task identifier. A common classifier-generator model LAMOL is used with for TASK-IL. In another approach based on prompting PLMs, a work in the art demonstrates the possibility of solving multiple NLP tasks in the zero-shot setting by expressing each of them via a task specific natural language prompt where the corresponding output is generated in an autoregressive fashion. For a given task, there was still a significant performance gap between zero-shot and supervised learning. To reduce this gap, an approach in the art expresses text classification and natural language inference in a cloze-style format and fine-tune the PLM in a few-shot setting. The same approach has since been attempted for various NLP tasks. In the context of Task-IL, LAMOL expresses different NLP tasks in the specific format proposed by a work in the art and fine-tunes the system on the entire tasks specific data.

However, the above generative replay based, and prompt based approaches have limitations while addressing LID. Current generative replay approaches struggle to generate representative samples because the generation is conditioned solely on the class/task label, whereas existing prompt-based approaches heavily rely on task identifier at the inference-time which is not true for class-incremental learning.

SUMMARY

Embodiments of the present disclosure present technological improvements as solutions to one or more of the above-mentioned technical problems recognized by the inventors in conventional systems.

For example, in one embodiment, a method for lifelong intent detection (LID) is provided. The method includes performing a joint training of an incremental learner implemented via the one or more hardware processors, to obtain a trained incremental learner for LID and a pseudo-labeled utterance generation, wherein a LID problem is modeled as a class Incremental Learning (class IL) problem, and wherein a training objective is to classify a user utterance into one of multiple pre-defined intents by minimizing a total Loss function ($L_{total}$), wherein the total Loss function ($L_{total}$) comprises: (a) a Lifelong Intent Detection (LID) loss function ($L_{ID}$) to train the incremental learner for an intent label generation, wherein the incremental learner generates the intent label corresponding to an input utterance using a prompt-based generative classification approach, wherein a prompt is created using one of a Prompt without question (PWQ) technique and a Prompt without incremental question (PWIQ) technique; (b) a Labeled Utterance Generation (LUG) loss function ($L_R$) to train the incremental learner for the pseudo-labeled utterance generation, wherein the incremental learner generates the pseudo-labeled utterance for an input intent label of an input prompt using a prompt augmented generative replay approach, wherein the input prompt is created using a LUG prompt function and comprises an input intent and a plurality of concept words from the input intent stored in a memory; (c) a Supervised Contrastive Training (SCT) loss function ($L_{SCT}$) to finetune the incremental learner using a valid utterance intent pair (U, I1) and a randomly chosen intent (I2) to predict whether I1 and I2 correspond to a same intent; and (d) a Knowledge Distillation (KD) loss function ($L_{KD}$) to fine-tune the incremental learner to alleviate catastrophic forgetting. Further, the method includes generating via the trained incremental learner of a previous instance, a current set of pseudo-labeled utterances. Further, the method includes receiving, at a current instance, labeled data corresponding to new input intents. Furthermore, the method includes iterating the joint training of the trained incremental learner of previous instance using the current set of pseudo-labeled utterances and the current instance labeled data corresponding to new input intents to generate a trained incremental learner for current instance. Furthermore, the method includes identifying a current plurality of concept words from the current instance labeled data corresponding to new input intents and storing the plurality of concept words in a replay memory for generation of the pseudo-labeled utterances in successive joint training of incremental learner.

In another aspect, a system for lifelong intent detection (LID) is provided. The system comprises a memory storing instructions; one or more Input/Output (I/O) interfaces; and one or more hardware processors coupled to the memory via the one or more I/O interfaces, wherein the one or more hardware processors are configured by the instructions to perform a joint training of an incremental learner implemented via the one or more hardware processors, to obtain a trained incremental learner for LID and a pseudo-labeled utterance generation, wherein a LID problem is modeled as a class Incremental Learning (class IL) problem, and wherein a training objective is to classify a user utterance into one of multiple pre-defined intents by minimizing a total Loss function ($L_{total}$). The total Loss function ($L_{total}$) comprises: (a) a Lifelong Intent Detection (LID) loss function ($L_{ID}$) to train the incremental learner for an intent label generation, wherein the incremental learner generates the intent label corresponding to an input utterance using a prompt-based generative classification approach, wherein a prompt is created using one of a Prompt without question (PWQ) technique and a Prompt without incremental question (PWIQ) technique; (b) a Labeled Utterance Generation (LUG) loss function ($L_R$) to train the incremental learner for the pseudo-labeled utterance generation, wherein the incremental learner generates the pseudo-labeled utterance for an input intent label of an input prompt using a prompt augmented generative replay approach, wherein the input prompt is created using a LUG prompt function and comprises an input intent and a plurality of concept words from the input intent stored in a memory; (c) a Supervised Contrastive Training (SCT) loss function ($L_{SCT}$) to finetune the incremental learner using a valid utterance intent pair (U, I1) and a randomly chosen intent (I2) to predict whether I1 and I2 correspond to a same intent; and (d) a Knowledge Distillation (KD) loss function ($L_{KD}$) to fine-tune the incremental learner to alleviate catastrophic forgetting. Further, the one or more hardware processors are configured to generate via the trained incremental learner of a previous instance, a current set of pseudo-labeled utterances. Further, the one or more hardware processors are configured to receive, at a current instance, labeled data corresponding to new input intents. Furthermore, the one or more hardware processors are configured to iterate the joint training of the trained incremental learner of previous instance using the current set of pseudo-labeled utterances and the current instance labeled data corresponding to new input intents to generate a trained incremental learner for current instance. Furthermore, the one or more hardware processors are configured to identify a current plurality of concept words from the current instance labeled data corresponding to new input intents and storing the plurality of concept words in a replay memory for generation of the pseudo-labeled utterances in successive joint training of incremental learner.

In yet another aspect, there are provided one or more non-transitory machine-readable information storage mediums comprising one or more instructions, which when executed by one or more hardware processors causes a method for lifelong intent detection (LID). The method includes performing a joint training of an incremental learner implemented via the one or more hardware processors, to obtain a trained incremental learner for LID and a pseudo-labeled utterance generation, wherein a LID problem is modeled as a class Incremental Learning (class IL) problem, and wherein a training objective is to classify a user utterance into one of multiple pre-defined intents by minimizing a total Loss function ($L_{total}$), wherein the total Loss function ($L_{total}$) comprises: (a) a Lifelong Intent Detection (LID) loss function ($L_{ID}$) to train the incremental learner for an intent label generation, wherein the incremental learner generates the intent label corresponding to an input utterance using a prompt-based generative classification approach, wherein a prompt is created using one of a Prompt without question (PWQ) technique and a Prompt without incremental question (PWIQ) technique; (b) a Labeled Utterance Generation (LUG) loss function ($L_R$) to train the incremental learner for the pseudo-labeled utterance generation, wherein the incremental learner generates the pseudo-labeled utterance for an input intent label of an input prompt using a prompt augmented generative replay approach, wherein the input prompt is created using a LUG prompt function and comprises an input intent and a plurality of concept words from the input intent stored in a memory; (c) a Supervised Contrastive Training (SCT) loss function ($L_{SCT}$) to finetune the incremental learner using a valid utterance intent pair (U, I1) and a randomly chosen intent (I2) to predict whether I1 and I2 correspond to a same intent; and (d) a Knowledge Distillation (KD) loss function ($L_{KD}$) to fine-tune the incremental learner to alleviate catastrophic forgetting. Further, the method includes generating via the trained incremental learner of a previous instance, a current set of pseudo-labeled utterances. Further, the method includes receiving, at a current instance, labeled data corresponding to new input intents. Furthermore, the method includes iterating the joint training of the trained incremental learner of previous instance using the current set of pseudo-labeled utterances and the current instance labeled data corresponding to new input intents to generate a trained incremental learner for current instance. Furthermore, the method includes identifying a current plurality of concept words from the current instance labeled data corresponding to new input intents and storing the plurality of concept words in a replay memory for generation of the pseudo-labeled utterances in successive joint training of incremental learner.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flow diagram illustrating a method for prompt augmented generative replay via supervised contrastive training for lifelong intent detection, implemented via the system of FIG. 1, in accordance with some embodiments of the present disclosure.

FIG. 8 illustrates a table depicting comparison of the PAGeR system with State of the Art (SOTA) approaches for varying sizes of replay memory, in accordance with some embodiments of the present disclosure.

Figure 1:
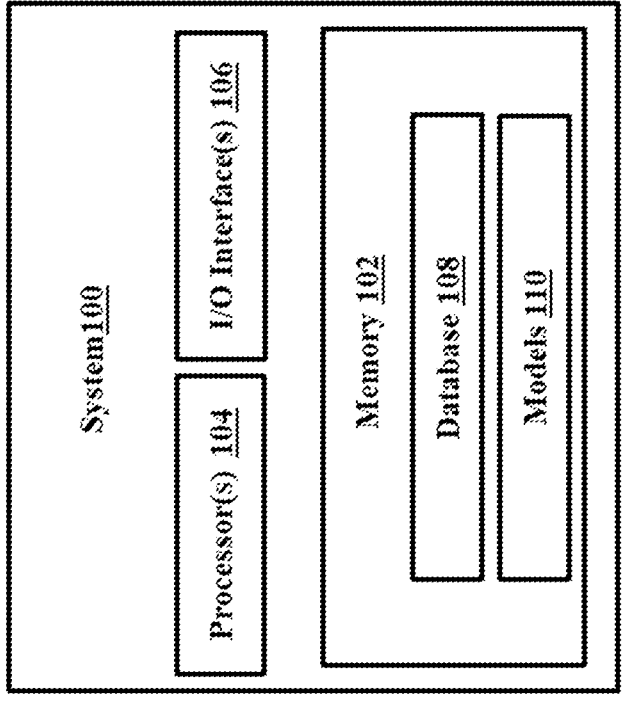
FIG. 1 is a functional block diagram of a system, also referred to as prompt augmented generative replay (PAGeR) system, for prompt augmented generative replay via supervised contrastive training for lifelong intent detection, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

It is understood that task based incremental learning (Task-IL) has challenges to address catastrophic forgetting. Current generative replay approaches for LID struggle to generate representative samples because the generation is conditioned solely on the class/task label, whereas existing prompt-based approaches heavily rely on task identifier at the inference-time, which is not true for class-incremental learning.

Embodiments of the present invention herein implement generative replay using Incremental learner such as Pretrained Language models (PLMs) for incremental intent detection, wherein prompt-based generation is obtained via pretrained language models (PLMs). Unlike exemplar replay, the method only stores the relevant contexts per intent in memory and uses these stored contexts (with the class label) as prompts for generating intent-specific utterances. Thus, the method models the lifelong intent detection, interchangeably referred to as LID, as a class-incremental learning (Class-IL) problem where a new set of intents/classes are added over a period of time, i.e., at each incremental step. To address the technical problem of catastrophic forgetting during LID, the incremental learner (for example a pre-trained language model (such as GPT-2 PLM) used by work in the literature 'LAnguage MOdeling for Lifelong Language Learning (LAMOL)' is extended to the Class-IL scenario and additionally with a Prompt Augmented Generative Replay (PAGeR) technique. In the PAGeR approach, real samples of old intents are not stored in the memory but instead concept words for each intent are stored. In successive incremental steps for training the incremental learner interchangeably referred as IL, samples for each prior intent are generated based on the natural language intent definition and the stored intent specific concept words via PAGeR. To further improve the quality of generative replay and overall classification performance, a supervised contrastive fine-tuning of the incremental learner and distill knowledge from the previous version of the lifelong intent detection while adapting it to the new set of intents.

The method discloses three prompts, two for expressing intent detection and one for labeled data generation for Class-IL. Pseudo-labeled utterance generation is guided by intent labels along with concepts words which are stored in memory instead of actual samples. The pseudo-labeled utterances refer to synthetic labeled data comprising utterance and intent(label) wherein utterances are generated by the system based on prompt based approach, unlike the real samples labeled in accordance with content in user utterance. The incremental learner, for example, the PLM is jointly fine-tuned on two tasks, a LID detection and pseudo-labeled utterance generation task. To minimize the likelihood of incorrect (Utterance, label) pairs, unlike existing methods, the incremental learner is further fine-tuned on a supervised contrastive learning objective. An example of utterance label pair is "Could you please tell me why my purchases from this morning say payment is pending?" UTTERANCE, "pending card payment"-INTENT To further alleviate catastrophic forgetting of old intents, Knowledge Distillation well known in the art is applied Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 is a functional block diagram of a system 100, for prompt augmented generative replay via supervised contrastive training for lifelong intent detection, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110. The plurality of modules 110 include programs or coded instructions that supplement applications or functions performed by the system 100 for executing different steps involved in the process of LID, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 comprise module (not shown) such as the incremental learner, a prompt generator comprising plurality of prompt generating techniques and the like. The memory 102 further has a replay memory to store the concept words obtained at each incremental learning step.

Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted piece of code for refinement and data that is processed, received, or generated as a result of the execution of the plurality of modules in the module(s) 110.

Although the data base 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference figures FIG. 2 through FIG. 8.

Figure 2:
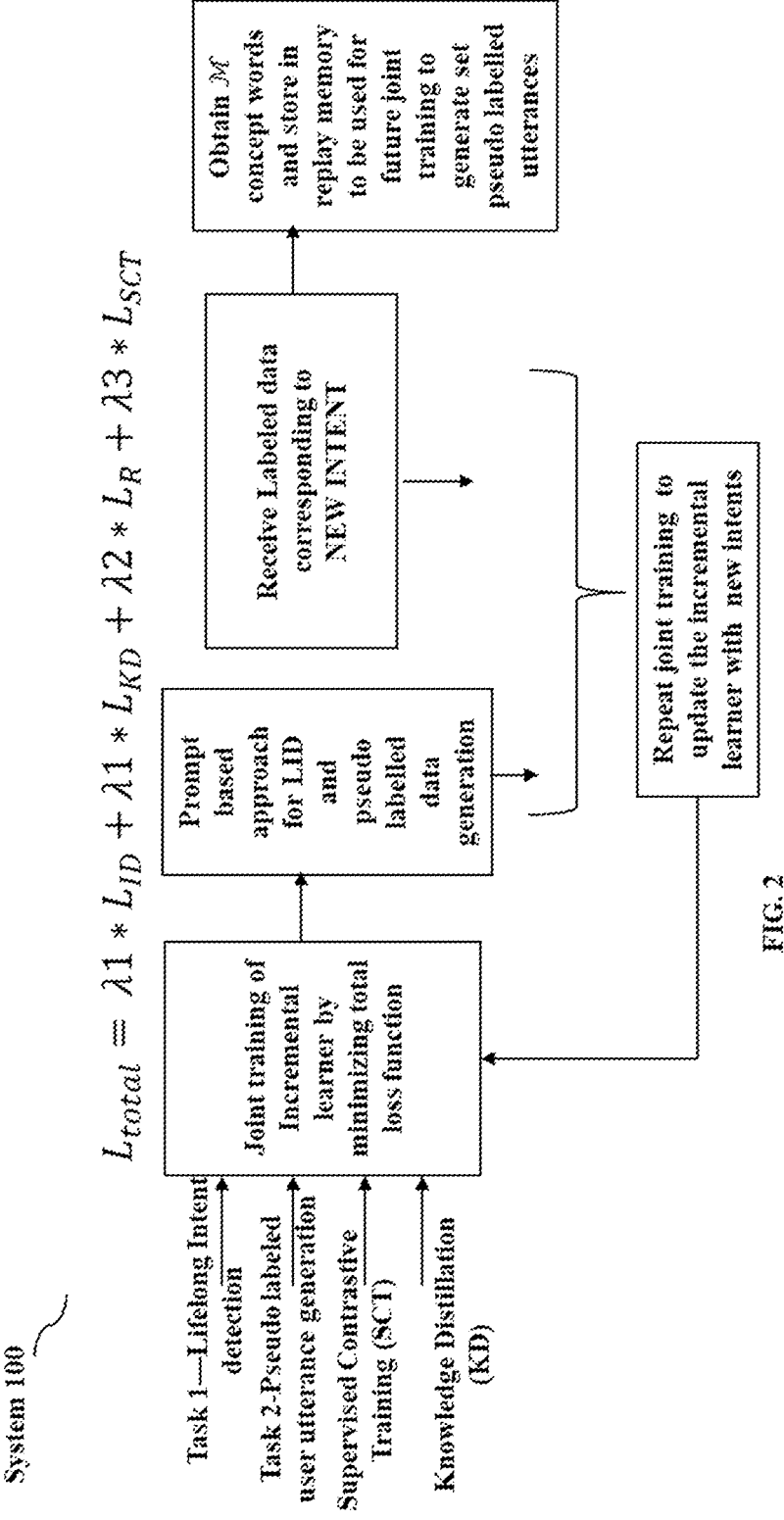
FIG. 2 illustrates a process overview of the system of FIG. 1 depicting joint training of incremental learner for Lifelong Intent Detection (LID) and a labeled utterance generation in accordance with some embodiments of the present disclosure.

FIG. 2 illustrates a process overview of the system 100 of FIG. 1 depicting joint training of incremental learner for Lifelong Intent Detection (LID) and a labeled utterance generation in accordance with some embodiments of the present disclosure. The system 100, also referred to as prompt augmented generative replay (PAGeR) system, utilizes a prompt augmented generative replay via supervised contrastive training for lifelong intent detection. Typically, a prompt is defined by a prompting function x'=fprompt(x) which is applied to an input x to obtain the corresponding prompt x' containing x, an (intermediate) answer z and task specific discrete or continuous tokens as task descriptors. The system 100 models lifelong intent detection (LID) as a class-incremental learning (class-IL) where a new set of intents/classes are added at each incremental step. To address the issue of catastrophic forgetting during the LID, an incremental learner is provided with Prompt Augmented Generative Replay, wherein unlike existing approaches that store real samples in replay memory, only concept words obtained from old intents are stored, which eliminates need of huge volume of old training data, thus reduces memory requirement, effectively speeding up incremental training still enabling not forgetting the old intents. An example of real samples and corresponding concept words is provided below:

{concept words: ["pending", "payment", "purchase" ], real sample: "could you please tell me why my purchases from this morning say payment is pending?"}

Joint training of an incremental learner is carried out for LID task and a pseudo-labeled utterance generation task with objective to classify a user utterance into one of multiple pre-defined intents by minimizing a total Loss function that integrates LID loss, Labeled Utterance Generation (LUG) loss, a Supervised Contrastive Training (SCT) loss and a Knowledge Distillation (KD) loss for a robustly trained incremental learner. FIG. 2 is further explained in conjunction with steps of flow diagram of FIG. 3.

The system 100 is now explained with PLM of the LAMOL as the incremental learner, as in not to be construed as limitation. To extent LAMOL to class –IL, the system 100 creates prompts using one of (a) a Prompt without question (PWQ) technique and)b) a Prompt without incremental question (PWIQ) technique. Further for pseudo-labeled utterance generation the incremental learner is provided with prompts generated using a prompt augmented generative replay approach. Components and process flow of FIG. 2 are further explained in conjunction with steps of flow diagram of FIG. 3.

FIG. 3 is a flow diagram illustrating a method 300 for prompt augmented generative replay via supervised contrastive training for lifelong intent detection, implemented via the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1, the system architecture of FIG. 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The system 100 models the LID problem as a class-IL problem where a set of new intents are introduced at each incremental step. An example of utterance and corresponding label or intent is provided below:

{Utterance: "could you please tell me why my purchases from this morning say payment is pending?" Label/Intent: Pending card Payment}

Consider $$D^i = \{I_1^i, I_2^i, \dots I_m^i\} \text{ and } I_j^i = \bigcup_{k=1}^r (x_{jk}^i, y_j^i)$$

where $$D^i = D_{train}^i \cup D_{val}^i \cup D_{test}^i$$

represents the set of new intents and $I_j^i$ represents labeled data corresponding to the $j^{th}$ intent introduced at the $i^{th}$ incremental step respectively.

$$x_{jk}^i$$

represents the $k^{th}$ natural language utterance corresponding to the $j^{th}$ intent introduced in the $i^{th}$ incremental step and the corresponding intent label is represented by $$y_j^i.$$

Unique intent labels introduced at the $i^{th}$ incremental step are represented by $$Y^i = \{y_1^i, y_2^i, \dots y_m^i\}$$

and there will not be any overlap between the intents introduced at different incremental steps, i.e., $Y^i \cap Y^t = \emptyset$ where $t \in \{1, 2, \dots, i-1\}$ and represent unique intent labels introduced so far where $$Y_{all}^i = Y^i \cup Y^{i-1} \cup \dots \cup Y^1.$$

At the $i^{th}$ incremental step the whole labeled data corresponding to previous intents, i.e., $$D_{old}^i = D_{train}^{i-1} \cup D_{train}^{i-2} \cup \dots \cup D_{train}^1$$

is not available for training but a fixed size memory $\mathcal{M} \ll |D_{old}|$ is accessible by the incremental learner. The incremental learner trained is represented at the $i^{th}$ incremental step by $IL_i$. And the $IL_i$ is evaluated on $$D_{test-full}^i = D_{test}^i \cup D_{test}^{i-1} \cup \dots \cup D_{test}^1$$

test which includes utterances corresponding to all the intents seen so far in addition to new intents. $I_{dist} = \{N^1, N^1, \dots, N^T\}$ represents the number of intents introduced over each incremental step where Ni represents number of new intents introduced at $i^{th}$ incremental step and T represents the total number of incremental steps for a dataset $D=D_1 \cup D_2 \cup, \ldots, \cup D_T$. Thus, at the $i+1^{th}$ incremental step the objective is to train a learner $IL_{i+1}$ given $$D_{i+1}^{train},$$

$\mathcal{M}$ and evaluate it on $$D_{test-full}^i.$$

Figure 4A:
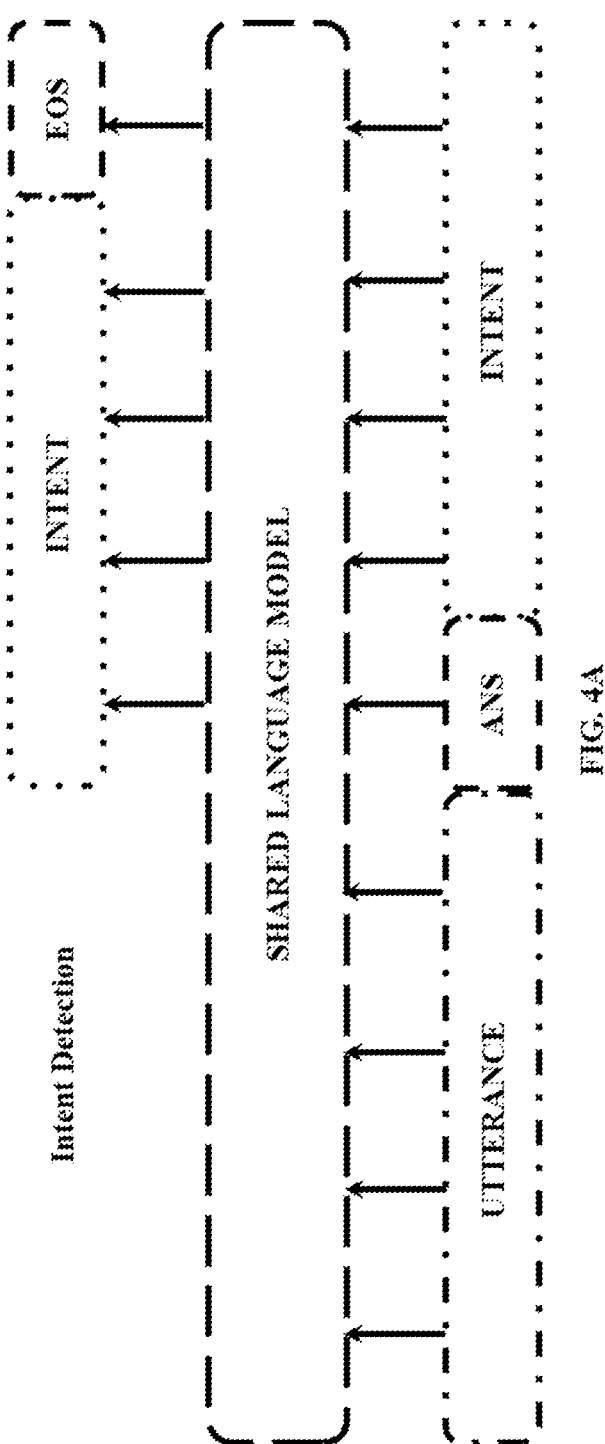
FIGS. 4A through 4C (collectively referred as FIG. 4) are illustrations depicting generation of intent label, a pseudo-labeled utterance for an input intent label, and a valid utterance intent pair and a randomly chosen intent for joint training of an incremental learner by the system of FIG. 1, in accordance with some embodiments of the present disclosure.
Figure 4B:
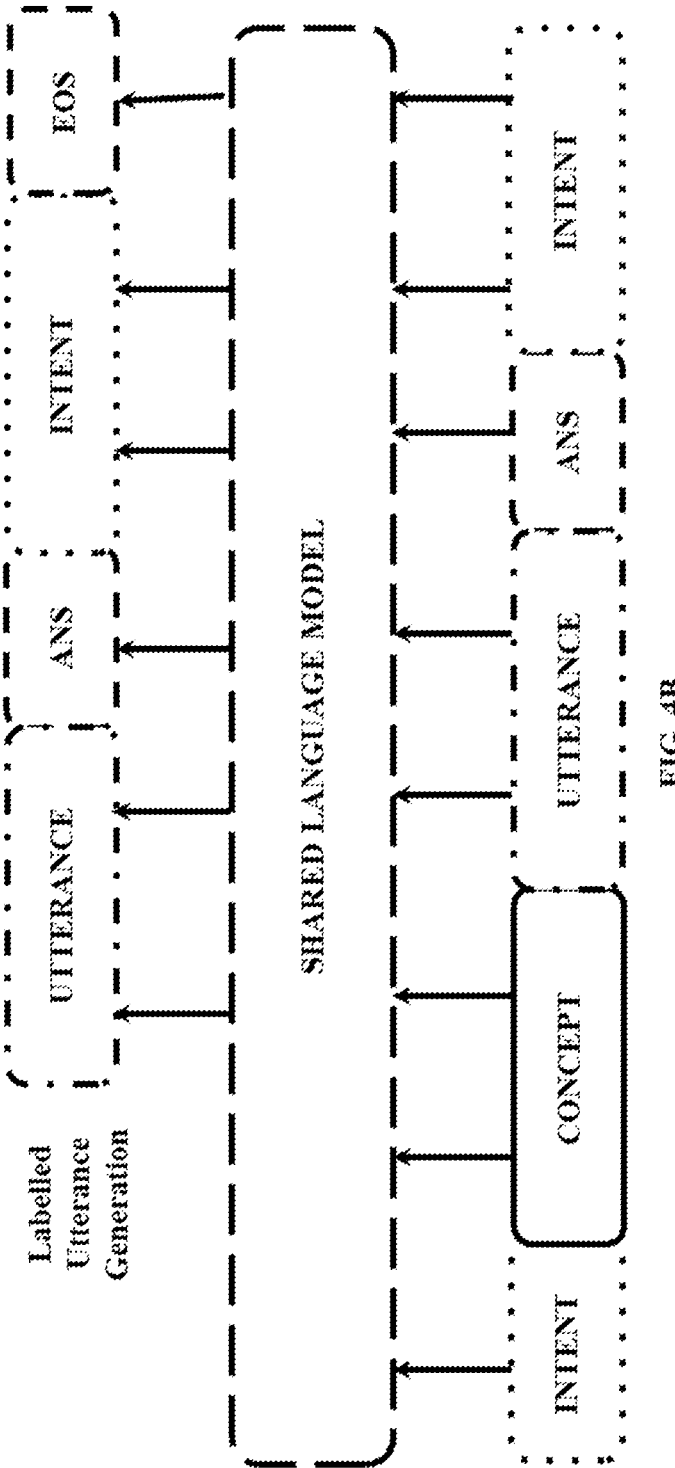
Figure 4C:
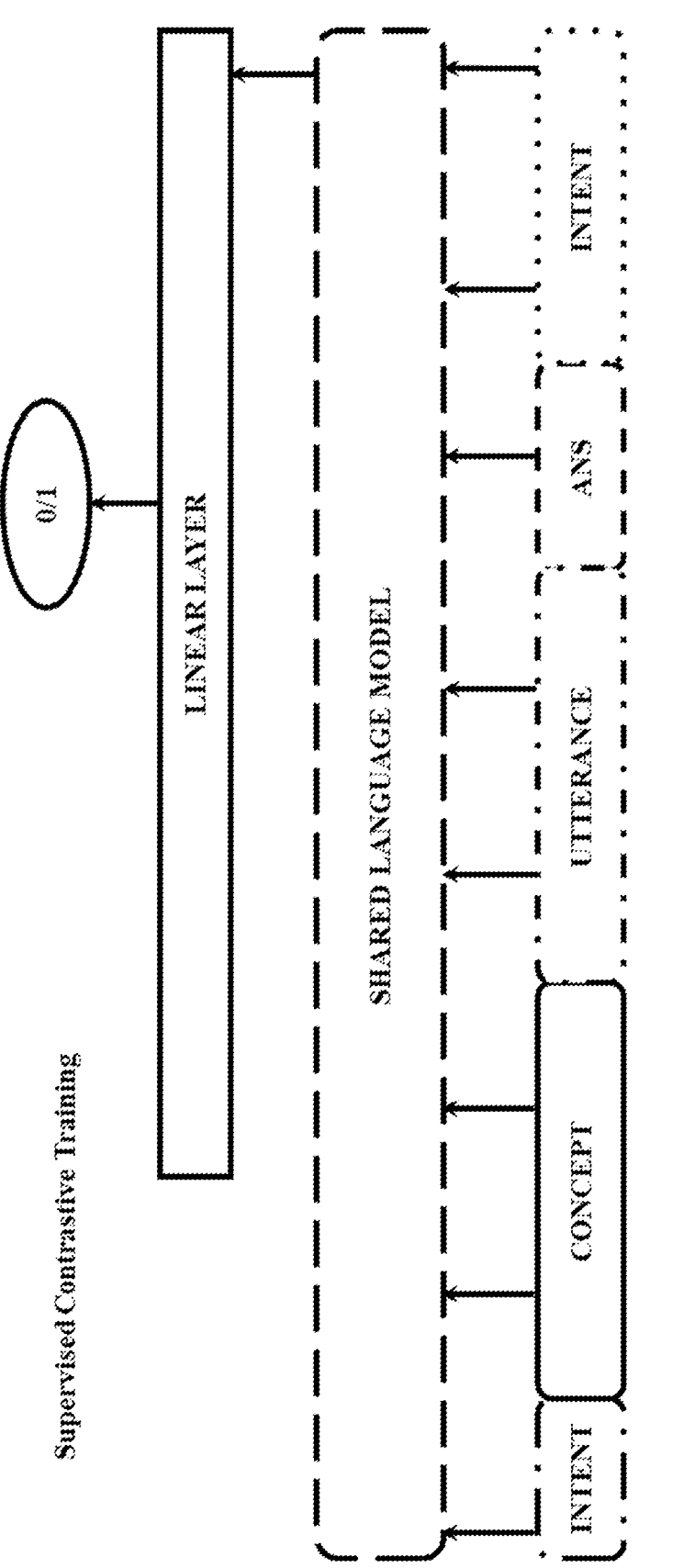

The LID is modeled as a text generation problem, as shown in FIG. 4A, where the objective is to generate the correct label $$y_j^{i+1}$$

for intents given a user utterance $$x_{jk}^{i+1},$$

while also utilizing generative replay to maintain performance on old intents. At the $i+1^{th}$ incremental step, the $IL_{i+1}$ is jointly fine-tuned or trained on the LID and the Labeled Utterance Generation (LUG)task, given $$`D_{i+1}^{train}, S_i`$$

which consists of labeled $$\left(D_{i+1}^{train}\right)$$

and pseudo-labeled $(S_i)$ utterances respectively. Pseudo-labeled utterances corresponding to intents present in $$D_{old}^i$$

are generated from $IL_i$ based on prompts stored in a fixed size memory, $\mathcal{M}$ as shown in FIG. 4B. To minimize the likelihood of incorrect $$\left(x_{jk}^{i+1}, y_{j+1}^{i+1}\right)$$

pairs, the supervised contrastive fine-tuning of $IL_{i+1}$, as shown in FIG. 4C is done. An example of incorrect pair is provided below:

Wrong pair: ("could you please tell me why my purchases from this morning say payment is pending?", Card Stolen)

Right Pair: ("could you please tell me why my purchases from this morning say payment is pending?", pending card payment)

To alleviate catastrophic forgetting, the KD is used for fine-tuning $IL_{i+1}$ on $S_i$ with soft targets on LID and LUG whereas we use hard targets while fine-tuning $IL_{i+1}$ ion novel or new intents in $$D_{i+1}^{train}.$$

For the remainder of this section, the superscript i+1 is dropped for simplicity, which indicates the $i+1^{th}$ incremental step. $(x,y)$ is used for $$\left(x_{jk}^{i+1}, y_j^{i+1}\right)$$

and refer to the $i+1^{th}$ step as the current incremental step.

Referring to the steps of the method 300, at step 302 of the method 300, the one or more hardware processors 104 perform a joint of the incremental learner implemented via the one or more hardware processors, to obtain a trained incremental learner for LID and pseudo-labeled utterance generation. As mentioned earlier, the LID problem is modeled as the class IL problem and example incremental learner referred herein is the PLM. The incremental learner is interchangeably referred herein in the description as PLM. The training objective is to classify a user utterance into one of multiple pre-defined intents by minimizing the total Loss function ($L_{total}$) comprising an LID loss function, a Labeled Utterance Generation loss function, a Supervised Contrastive Training loss function, and a Knowledge Distillation loss function.

Lifelong Intent Detection (LID) loss function ($L_{ID}$): The $L_{ID}$ fine-tunes the incremental learner for an intent label generation. The incremental learner generates an intent label corresponding to an input utterance using a prompt-based generative classification approach. As mentioned, the prompt is created using one of the Prompt without question (PWQ) technique and the Prompt without incremental question (PWIQ) technique.

Figures 5A, 5B, 5C:
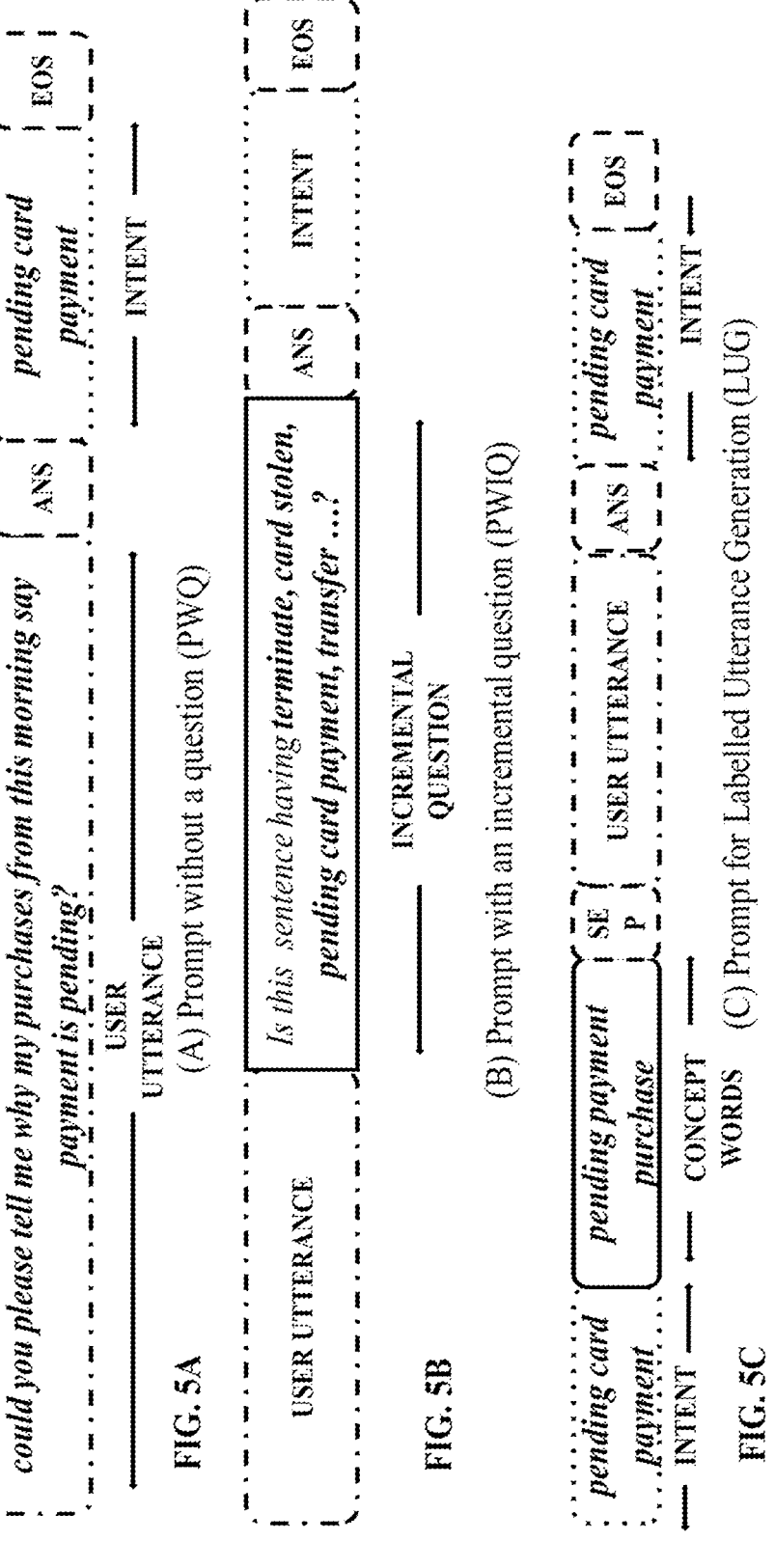
FIGS. 5A through 5C (collectively referred as FIG. 5) illustrates examples of answered prompts using Prompt without a question (PWQ) technique, Prompt with an incremental question (PWIQ) technique for intent detection, and prompt for the pseudo-labeled utterance generation by the system of FIG. 1, in accordance with some embodiments of the present disclosure.

In Task-IL of the existing methods provides a task identifier at inference time, and the model performs the corresponding task. In Class-IL, no class/task information is provided apriori which makes the problem more challenging and not amenable to existing models such as LAMOL. This the method 300 discloses the PWQ and the PWIQ techniques for prompt generation for intent detection such that the LAMOL can be extended to Class-IL.

i) Prompt without question (PWQ): In PWQ, each user utterance x in a prompt is converted by applying a pre-defined template as mentioned in equation 1. An example of Answered Prompt corresponding to PWQ is shown in FIG. 5A

Prompt with incremental question (PWIQ): In the PWIQ, each user utterance x is transformed into a prompt by application of a pre-defined template as mentioned in equation 2, where IncQ at the current incremental step includes all the intent labels Y i+1 all seen so far. An example of the Answered Prompt corresponding to PWIQ is shown in FIG. 5B.

$$f_{prompt}^{PWQ}(x) = (x, ANS, y, EOS) \tag{1}$$

$$f_{prompt}^{PWIQ}(x) = (x, IncQ, ANS, y, EOS) \tag{2}$$

where, ANS and EOS refers to special tokens used during prompt creation. The PWQ based finetuning of $IL_i$ on $$D_{i+1}^{train} \cup S_i$$

is performed to arrive at the $IL_{i+1}$ by maximizing $\log(p(y, EOS|x, ANS; \varphi))$ or by minimizing the loss function as mentioned in equation 3. $(w_1, \ldots, w_n)$, $(y_1, \ldots, y_N)$ are the set of tokens present in x and y respectively. Further, n and N represent the number of tokens in the utterance and intent label, respectively.

$$LID = -\log(p(y, EOS|x, ANS; \varphi)) \tag{3}$$

The Labeled Utterance Generation (LUG) loss function $(L_R)$: The $L_R$ fine-tunes (trains) the incremental learner for the pseudo-labeled utterance generation. The incremental learner generates the pseudo-labeled utterance for an input intent label of an input prompt using the prompt augmented generative replay approach, wherein the input prompt is created using a LUG prompt function and comprises an input intent and a plurality of concept words from the input intent stored in a memory.

To generate high quality pseudo-labeled utterances for generative replay in subsequent incremental steps, the intent specific generative model is conditioned on an 'intent label' and the corresponding intent concepts. For each intent $I_j$, the top-K term frequency-inverse document frequency $(tf-idf_j)$ are obtained from the utterances corresponding to intent $I_j$ to create a prompt. A maximum of K=50 tf-idf words per intent are used. Words which are part of both x and $tf-idf_j$ are referred to as intent concepts and $C_j=\{c_{j1}, c_{j2}, \ldots, c_{jr}\}$ represents a set of concept sequences one per labeled utterance present in $I_j$. The template outlined in equation 4 is used to create a prompt for LUG and the corresponding Answered Prompt as shown in FIG. 5C. The $IL_{i+1}$ (trained incremental learner) for prompt based generation by minimizing the loss function in equation 5.

$$f_{prompt}^{LUG}(y, c) = (y, c, SEP, x, ANS, y, EOS) \tag{4}$$

The $IL_i$ (incremental learner trained at previous instance) is trained along with $\mathcal{M}$ to generate the pseudo-labeled data $S_i$ corresponding to intents present in $$D_{old}^i$$

for training of $IL_{i+1}$ (obtained a trained incremental learner at current instance). Existing replay based approaches either store a few labeled utterances per intent in $\mathcal{M}$ or generate an equal number of pseudo-labeled utterances. The PAGeR system instead uses the same memory to store tf-idf concept words from $C_j$ for every intent along with $y_j$ and generates pseudo labeled utterances corresponding to each entry in memory.

$$L_R = -(\log(p(x, ANS, y, EOS|y, c_{jk}, SEP; \varphi))) \tag{5}$$

The Supervised Contrastive Training (SCT) loss function $(L_{SCT})$: The $L_{SCT}$ fine-tunes or trains the incremental learner using a valid utterance intent pair $(U, I_1)$ and a randomly chosen intent $(I_2)$ to predict whether $I_1$ and $I_2$ correspond to a same intent. To minimize the likelihood of incorrect utterance-label pairs during LID and LUG, the $IL_{i+1}$ (trained incremental learner) is explicitly fine-tuned or trained on positive and negative utterance-label pairs via contrastive loss as shown in equation 6. A pair $((x,y),y')$ where $y' \in Y_{all}$ is positive if $y=y'$ or negative otherwise. $p_{ul}=sigmoid(W_c h_{EOS}+b_c)$, represents the probability that $((x,y),y')$ is positive and hEOS is a representation of EOS token from the PLM. $W_c$ and $b_c$ represents the weight and bias of a linear layer, respectively.

$$L_{SCT} = p_{ul} * \log(p_{ul}) + (1 - p_{ul}) * \log(1 - p_{ul}) \tag{6}$$

The Knowledge Distillation (KD) loss function $(L_{KD})$: The $L_{KD}$ fine-tunes the incremental learner to alleviate catastrophic forgetting. The KD well known in the art is used in the context of LID where instead of hard targets soft targets are to train $IL_{i+1}$ on $S_i$. For intent detection, the knowledge is distilled from $IL_i$ while training $IL_{i+1}$ by minimizing the loss function in equation 7 where $p'(y_s+1)$ is obtained from $IL_i$ and $y_o=ANS$.

$$L_{KD} = -\frac{1}{N}\Sigma_{s=0}^{N} p'(y_s + 1) * \log(p(y_s + 1|x, y_O, \ldots \ldots y_s; \varphi)) \tag{7}$$

At the current incremental step, the $IL_i$ is incrementally updated based on $Di+1$ $train \cup Si$ by minimizing $L_{total}$ as shown in equation 8 to get $IL_{i+1}$.

$$L_{total} = \lambda 1 * L_{ID} + \lambda 1 * L_{KD} + \lambda 2 * L_R + \lambda 3 * L_{SCT} \tag{8}$$

where $\lambda 1$, $\lambda 2$, $\lambda 3$ are the set of hyperparameters of the incremental learner. At inference, $IL_{i+1}$ is used to generate intent labels for all utterances in $$D_{test-full}^i.$$

A PAGeR-Base is defined as a baseline for PAGeR system (the system 100), which extends LAMOL for Class-IL. The PAGeR-Base is trained on $\lambda 1 * L_{ID} + \lambda 2 * L_R$ as the loss function where replay samples are generated based on the PWQ prompt.

Referring back to the steps of method 300, at step 304, the trained incremental learner of a previous instance implemented by the one or more hardware processors 104 generates a current set of pseudo-labeled utterances. As mentioned earlier, the pseudo-labeled utterances refer to synthetic labeled data comprising utterance and intent (label) wherein utterances are generated by the system based on prompt based approach (herein for current instance), unlike the real samples labeled in accordance with content in user utterance. At step 306, the one or more hardware processors 104 receive, at a current instance, labeled data corresponding to new input intents. At step 306, the one or more hardware processors 104 iterate the joint training of the trained incremental learner of previous instance using the current set of pseudo-labeled utterances and the current instance labeled data corresponding to new input intents to generate a trained incremental learner for current instance. At step 310, the one or more hardware processors 104 identifying a current plurality of concept words from the current instance labeled data corresponding to new input intents and storing them in a replay memory for generation of the pseudo-labeled utterances in successive joint training of incremental learner.

Experiments:

Dataset Description:

Lifelong Intent Detection: CLINC150 (Larson et al., 2019) is a crowdsourced multi-domain (10 domains such as utility, travel etc.) intent detection dataset. HWU64 (Liu et al., 2019) is a crowdsourced multi-domain (21 domains such as alarm, cooking etc.) intent detection dataset. BANKING77 (Casanueva et al., 2020) is an imbalanced, fine-grained intent detection dataset from the banking domain. SGD (Rastogi et al., 2020) and MWOZ (Budzianowski et al., 2018) are multidomain dialogue datasets which consist of dialogues from 19 and 8 domains, respectively.

Text Classification: Stackoverflow (S20) (Xu et al., 2017) is a multi-class classification dataset comprising of 20,000 question titles from Stackoverflow each tagged with one of 20 different tags.

Lifelong Relation Extraction: FewRel (Han et al., 2018): is a relation extraction dataset, where the objective is to predict a relation type between a pair of entities in a given sentence/paragraph. For all datasets, we use standard train-test split provided by respective authors (shown in Table 5

Baseline Approaches: Upper Bound (UB) is used where assumption is that data corresponding to all incremental steps is available apriori and fine-tune IL on all $D_i$'s together and in Lower Bound (LB), we incrementally finetune IL on $D_i$'s with $|\mathcal{M}|=0$.

Lifelong Intent Detection:

(i) Elastic weight consolidation (EWC, Kirkpatrick et al, 2017): Remembers old tasks by selectively slowing down learning on the weights important for these tasks.

(ii) Averaged-Gradient episodic memory (A-GEM, Chaudhry et al., 2019a): A-GEM tries to ensure that at every training step the average episodic memory loss over the previous tasks does not increase.

(iii) ER (Rolnick et al., 2019): Interleaving old samples with current data in training batches.

(iv) Dark Experience Replay (DER) (Buzzega et al., 2020): Rehearsal with knowledge distillation and regularization.

(v) AdapterCL (Madotto et al., 2021): Train a task specific residual adapters (Houlsby et al., 2019) and uses an entropy-based classifier to select which adapter to use at test time.

Lifelong Relation Extraction:

(i) GEM (Lopez-Paz and Ranzato, 2017): GEM ensures that at every training step the loss for each of the previous tasks, approximated by the samples in episodic memory, does not increase.

(ii) EMR (Parisi et al., 2019): Jointly train a model on current and old labeled samples stored in memory.

(iii) EA-EMR (Wang et al., 2019): They utilize an explicit alignment model to mitigate the sentence embedding distortion of the learned model when training on new data and new relations.

(iv) Episodic memory activation and reconsolidation (EMAR) (Han et al., 2020): Every time neural models are activated to learn both new and memorized data, EMAR utilizes relation prototypes as a memory reconsolidation exercise to keep a stable understanding of old relations.

Evaluation Metrics: The following two metrics are used for evaluating performance on the lifelong intent detection task. Average Accuracy (Chaudhry et al., 2018).

$$Avg_{acc}^{k'}$$

is used to evaluate the performance after k' incremental steps where $$Acc_{avg}^{k'} = \frac{1}{k'}\sum_{i=1}^{k'} A\left(IL_{k'}\left(D_{test}^i\right)\right)$$

and $$\sum_{i=1}^{k'} A\left(\left(D_{test}^i\right)\right)$$

represents classification accuracy obtained by $IL_{k'}$ after k' incremental steps on $$D_{test}^i.$$

Average Forgetting (F) (Chaudhry et al., 2018).

$$F_{avg}^{k'}$$

is used to measure the average drop in intent classification accuracy for intents introduced after k' incremental steps where $$F_{avg}^{k'} = \frac{1}{k'}\sum_{i=1}^{k'-1}\max 1 \le t \le k' A\left(IL_t\left(D_{test}^i\right)\right) - A\left(IL_{k'}\left(D_{test}^i\right)\right)$$

(lower value of $$F_{avg}^{k'}$$

implies less forgetting).

Results and Discussion: For lifelong intent detection task, the PAGeR system or system 100, also referred to as PAGeR hereinafter is compared with State of the art (SOTA) approaches for Class-IL from the NLP and vision community on three imbalanced and one balanced intent detection dataset. The comparison is performed across three different sizes for $\mathcal{M}$. For a given $\mathcal{M}$, all baselines are run, including PAGeR-Base and PAGeR over four different intent permutations and report $$Acc_{avg}^T \text{ and } F_{avg}^T.$$

FIG. 8 illustrates a table depicting comparison of the PAGeR system with State of the Art (SOTA) approaches for varying sizes of replay memory, in accordance with some embodiments of the present disclosure. As shown in Table 1, the PAGeR outperforms the baselines for all possible dataset-$\mathcal{M}$ combinations. In low memory scenarios, i.e., $\mathcal{M}$ =1%, PAGeR outperforms exemplar replay based baselines by high margins which indicates that while it is not possible to store all representative samples in a given memory, these may be generated based on concept words. EWC and A-GEM are found to be less effective in the Class-IL setting. With $\mathcal{M}$ =1%, PAGeR also outperforms AdapterCL on all datasets except C150I. The PAGeR also outperforms other baselines for incremental text classification on the S20 dataset. Even with $\mathcal{M}$ =1%, PAGeR gets an average accuracy, $$Acc_{avg}^T$$

of 84.3% which is only 6.5% below the UB. For S20, numeric label ids are used as class labels to demonstrate that the PAGeR also works when labels are not informative.

Figure 6:
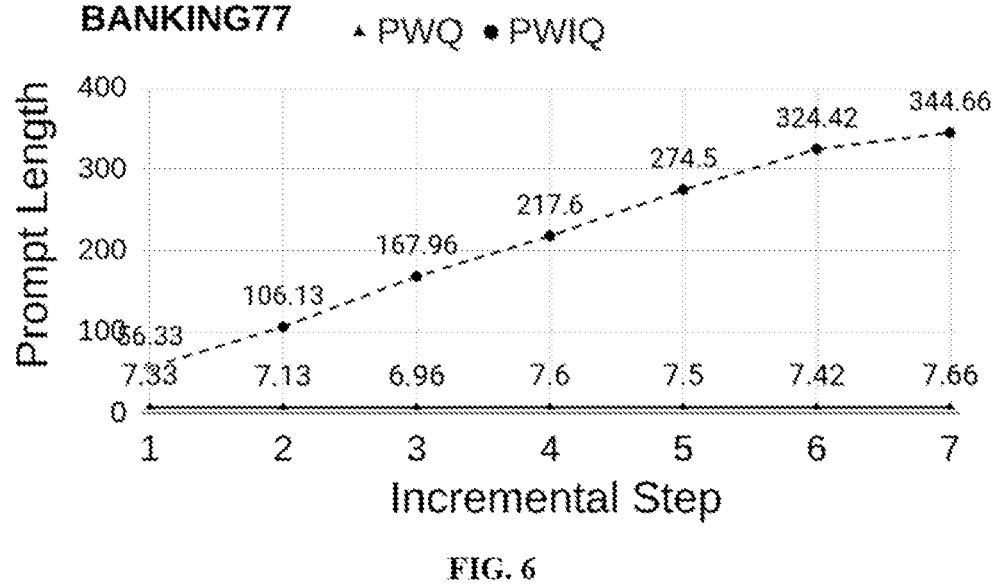
FIG. 6 illustrates comparison between the PWQ technique and the PWIQ technique in context of incremental steps of an incremental learner for intent label generation, in accordance with some embodiments of the present disclosure.

PWQ Vs PWIQ: As shown in FIG. 6 the length of PWIQ prompt depends on the number of intent labels which increases at every incremental step and leads to large sequence length whereas the length of PWQ prompt is independent of the number of intent labels. And large sequence length leads to more running time. Hence, PWQ prompt can be extended to operate over a large number of incremental steps.

Figure 7:
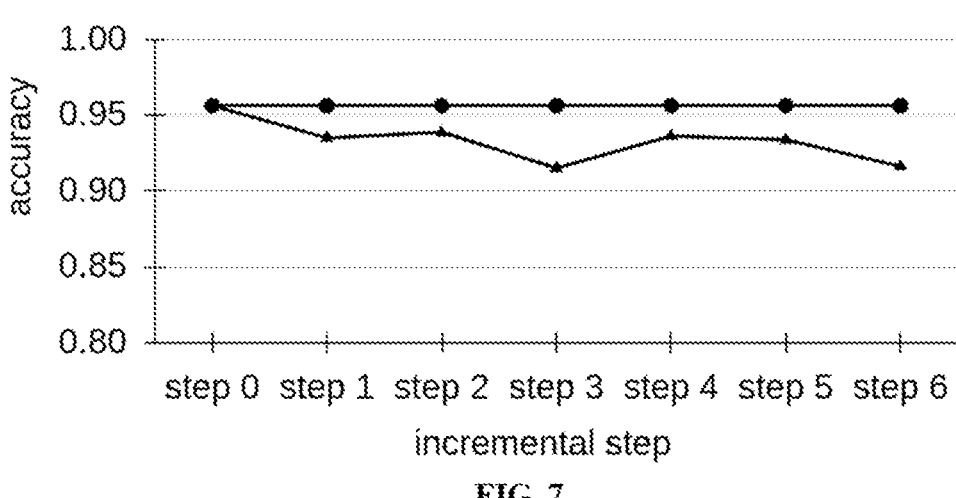
FIG. 7 illustrates accuracy comparison between the PWQ technique and the PWIQ technique in context of the incremental steps of the incremental learner for intent label generation, in accordance with some embodiments of the present disclosure.

Significance of the pseudo-labeled utterances: To alleviate catastrophic forgetting in the LID and LUG tasks, pseudo-labeled utterances for generative replay. To empirically assess the quality of pseudo-labeled utterances over incremental steps, the following experiment is performed: Only those intents that have been introduced at the first incremental step are considered. On these intents, an intent detection model (incremental learner) is trained at each incremental step where we use pseudo labeled utterances generated by $IL_i$ at $i^{th}$ incremental step and compare it with the model trained on real labeled-utterances (Upper Bound). As shown in FIG. 7, on the B77 dataset, the drop in average accuracy is not significant for these intents over incremental steps. This suggests that pseudo-labeled utterances generated by the incremental learner are close to original utterances, i.e., generative replay plays an important role towards alleviating catastrophic forgetting in both LID and LUG tasks.

Ablation Study: Ablation experiments are conducted on the B77 dataset across all memory sizes to demonstrate the efficacy of the PAGeR's sub-components as shown in Table 2.

TABLE 2

| Approach | $\mathcal{M} = 10\%$ | $\mathcal{M} = 5\%$ | $\mathcal{M} = 1\%$ |
|---|---|---|---|
| PAGeR-Base(LAMOL)(A) | 82.9 | 81.1 | 68.1 |
| A w/LUG only | 87.6 | 86.0 | 73.8 |
| A w/SCT only | 87.9 | 86.2 | 72.1 |
| A w/KD only | 82.4 | 80.7 | 69.1 |
| B w/o LUG | 89.7 | 88.7 | 78.5 |
| B w/o SCT | 88.8 | 88.0 | 76.7 |
| B w/o KD | 90.0 | 87.7 | 74.8 |
| PAGeR (B) | 90.2 | 89.2 | 80.1 |

Individually, all three components when applied with PAGeR-Base, show significant improvement in performance $$\left(Acc_{avg}^T\right).$$

LUG, when applied with PAGeR-Base to generate better representative samples for replay, boosted the $$Acc_{avg}^T$$

of PAGeR-Base by 4.7%, 4.9% and 5.7% in experiments where $\mathcal{M}$ is set to 10%, 5% and 1% respectively. Applying SCT with PAGeR-Base also shows significant improvement in experiments across different sizes for $\mathcal{M}$. Results of PAGeR-Base with KD only, affects the $$Acc_{avg}^T$$

of PAGeR-Base by −0.5%, −0.4% and +1.0% in experiments when $\mathcal{M}$ is 10%, 5% and 1% respectively suggesting that usage of KD by itself is not effective in alleviating catastrophic forgetting. In row PAGeR w/o LUG, removing LUG from the combined approach highlights the importance of LUG and how the other two components, SCT and KD, are complementary to each other. This is reflected in the improved performance of—by 6.8%, 7.6% and 10.4% in experiments with $\mathcal{M}$ set to 10%, 5% and 1% respectively. Similar trend is proven by rows PAGeR w/o SCT, PAGeR w/o KD, suggesting how all of these components are complementary to each other. In case of small memory size ($\mathcal{M}$ =1%), all three components are required to achieve good intent detection accuracy, i.e., there is a drop of 1.5%, 3.4%, and 5.3% if LUG, SCT and KD is removed from the PAGeR. When all components are applied together with PAGeR-Base to give PAGeR, the $$Acc_{avg}^T$$

improves from 82.9% to 90.2%, 81.1% to 89.2%, and 68.1% to 80.1% with M set to 10%, 5% and 1% respectively. Approach $\mathcal{M}$ =10% $\mathcal{M}$ =5% $\mathcal{M}$ =1%. In PAGeR-Base (LAMOL), generative replay is based on only intent labels whereas in PAGeR-Base (LAMOL)+LUG, we use intent specific concept words along with intent labels for generative replay. Except UB and LB, we have taken all baseline results from (Han et al., 2020)

Lifelong Relation Extraction: The PAGeR is applied on a lifelong relation extraction task with the same experimental setup as described in Han et al. (2020), where the objective is to identify the correct relation mentioned in a given sentence from a set of candidate relations. To utilize candidate relations in PAGeR, PWIQ is used instead of PWQ and replace User Utterance, Incremental Question and Intent with sentence, candidate relations and correct relations respectively as outlined in FIG. 5B. The PAGeR outperforms the state-of-the-art baseline EMAR by 13.4% in terms of $$Acc_{avg}^T$$

and is only 1.4% below the UB with $\mathcal{M}$ =50 per incremental step, as shown in Table 3.

TABLE 3

| $\mathcal{M}$ | Approach | FewRel |
|---|---|---|
| 50 labeled samples per incremental step | UB | 92.7 |
| | LB | 66.2 |
| | EWC | 30.2 |
| | GEM | 59.8 |
| | A-GEM | 47.5 |
| | EMR | 65.1 |
| | EA-EMR | 69.9 |
| | EMAR | 77.9 |
| | PAGeR | 91.3 |

These results suggest that the PAGeR can be extended to other class incremental NLP problems.

Multi-domain Dialog: The PAGeR is also evaluated in a scenario where new intents are added as part of new domain at each incremental step and K previous utterances are used along with current utterance for intent detection. SGD, MWOZ multi-domain dialogue datasets are used and compared with the PAGeR with AdapterCL. As shown in Table 4, in this scenario, PAGeR outperforms AdapterCL.

TABLE 4

| | SGD | | MWOZ | |
|---|---|---|---|---|
| Approach | K = 0 | K = 1 | K = 0 | K = 1 |
| AdapterCL | 65.0 | 77.0 | 94.5 | 96.51 |
| PAGeR | 77.12 | 92.6 | 98.10 | 96.0 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for Lifelong Intent Detection (LID), the method comprising:

performing a joint training, by one or more hardware processor, of an incremental learner implemented via the one or more hardware processors, to obtain a trained incremental learner for LID and a pseudo-labeled utterance generation, wherein the pseudo-labeled utterances refer to synthetic labeled data comprising utterance and intent, wherein the utterance is generated based on prompt based approach, wherein the joint training repeats at regular intervals for new input intent is received, and wherein the plurality of concept words from the new input intent are identified as top-K term frequency-inverse document frequency (tf-idf)) words, wherein a LID problem is modeled as a class Incremental Learning (class IL) problem, and wherein a training objective is to classify a user utterance into one of multiple pre-defined intents by minimizing a total Loss function ($L_{total}$), wherein the total Loss function ($L_{total}$) comprises:

a) a Lifelong Intent Detection (LID) loss function ($L_{ID}$) to train the incremental learner for an intent label generation, wherein the incremental learner generates the intent label corresponding to an input utterance using a prompt-based generative classification approach, wherein no overlap between the intents are generated at different incremental steps, wherein a prompt is created using one of a Prompt without question (PWQ) technique and a Prompt without incremental question (PWIQ) technique;

b) a Labeled Utterance Generation (LUG) loss function ($L_R$) to train the incremental learner for the pseudo-labeled utterance generation, wherein the incremental learner generates the pseudo-labeled utterance for an input intent label of an input prompt using a prompt augmented generative replay approach, wherein the input prompt is created using a LUG prompt function and comprises an input intent and a plurality of concept words from the input intent stored in a memory, wherein only storing relevant contexts per intent in the memory and using stored contexts with the class label as prompts for generating intent-specific utterances, thereby eliminating need of volumes of old training data, and reducing memory requirement, speeding up incremental training still enabling not forgetting old intents;

c) a Supervised Contrastive Training (SCT) loss function ($L_{SCT}$) to fine-tune the incremental learner using a valid utterance intent pair (U, I1) and a randomly chosen intent (I2) to predict whether I1 and I2 correspond to a same intent, wherein to minimize the likelihood of incorrect utterance-label pairs during LID and LUG, the trained incremental learner is explicitly trained on positive and negative utterance-label pairs via contrastive loss; and d) a Knowledge Distillation (KD) loss function ($L_{KD}$) to fine-tune the incremental learner to alleviate catastrophic forgetting;

generating, by the trained incremental learner of a previous instance, implemented by the one or more hardware processors, a current set of pseudo-labeled utterances;

receiving, at a current instance, labeled data corresponding to new input intents by the one or more hardware processor;

iterating, by the one or more hardware processors, the joint training of the trained incremental learner of previous instance using the current set of pseudo-labeled utterances and the current instance labeled data corresponding to new input intents to generate a trained incremental learner for current instance; and identifying, by the one or more hardware processor, a current plurality of concept words from the current instance labeled data corresponding to new input intents and storing the plurality of concept words in a replay memory for generation of the pseudo-labeled utterances in successive joint training of incremental learner.

2. The processor implemented method of claim 1, wherein the total Loss function ($L_{total}$) is mathematically represented as: $L_{total} = \lambda 1 * L_{ID} + \lambda 1 * L_{KD} + \lambda 2 + L_R + \lambda 3 * L_{SCT}$, wherein $\lambda 1$, $\lambda 2$, $\lambda 3$ are set of hyperparameters of the incremental learner.

3. The processor implemented method of claim 1, wherein the prompt created using the PWQ technique is based on a PWQ prompt function, mathematically represented as:

$$f_{prompt}^{PWQ}(x) = (x, ANS, y, EOS),$$

wherein x is the user utterance, ANS and EOS refers to special tokens used during prompt creation, and y is labeled data.

4. The processor implemented method of claim 1, wherein the prompt created using the PWIQ technique is based on a PWIQ prompt function, mathematically represented as:

$$f_{prompt}^{PWIQ}(x) = (x, IncQ, ANS, y, EOS),$$

wherein x is the user utterance, ANS, EOS refers to special tokens used during prompt creation, and IncQ at a current instance includes all the intent labels from y labeled data.

5. A system for Lifelong Intent Detection (LID), the system comprising:

a memory storing instructions;

one or more Input/Output (I/O) interfaces; and one or more hardware processors coupled to the memory via the one or more I/O interfaces, wherein the one or more hardware processors are configured by the instructions to:

perform a joint training of an incremental learner implemented via the one or more hardware processors, to obtain a trained incremental learner for LID and a pseudo-labeled utterance generation, wherein the pseudo-labeled utterances refer to synthetic labeled data comprising utterance and intent, wherein the utterance is generated based on prompt based approach, wherein the joint training repeats at regular intervals for new input intent is received, and wherein the plurality of concept words from the new input intent are identified as top-K term frequency-inverse document frequency (tf-idf)) words, wherein a LID problem is modeled as a class Incremental Learning (class IL) problem, and wherein a training objective is to classify a user utterance into one of multiple pre-defined intents by minimizing a total Loss function ($L_{total}$), wherein the total Loss function ($L_{total}$) comprises:

a) a Lifelong Intent Detection (LID) loss function ($L_{ID}$) to train the incremental learner for an intent label generation, wherein the incremental learner generates the intent label corresponding to an input utterance using a prompt-based generative classification approach, wherein no overlap between the intents are generated at different incremental steps, wherein a prompt is created using one of a Prompt without question (PWQ) technique and a Prompt without incremental question (PWIQ) technique;

b) a Labeled Utterance Generation (LUG) loss function ($L_R$) to train the incremental learner for the pseudo-labeled utterance generation, wherein the incremental learner generates the pseudo-labeled utterance for an input intent label of an input prompt using a prompt augmented generative replay approach, wherein the input prompt is created using a LUG prompt function and comprises an input intent and a plurality of concept words from the input intent stored in a memory, wherein only storing relevant contexts per intent in the memory and using stored contexts with the class label as prompts for generating intent-specific utterances, thereby eliminating need of volumes of old training data, and reducing memory requirement, speeding up incremental training still enabling not forgetting old intents;

c) a Supervised Contrastive Training (SCT) loss function ($L_{SCT}$) to finetune the incremental learner using a valid utterance intent pair (U, I1) and a randomly chosen intent (I2) to predict whether I1 and I2 correspond to a same intent, wherein to minimize the likelihood of incorrect utterance-label pairs during LID and LUG, the trained incremental learner is explicitly trained on positive and negative utterance-label pairs via contrastive loss; and d) a Knowledge Distillation (KD) loss function ($L_{KD}$) to fine-tune the incremental learner to alleviate catastrophic forgetting;

generate via the trained incremental learner of a previous instance, a current set of pseudo-labeled utterances;

receive, at a current instance, labeled data corresponding to new input intents;

iterate the joint training of the trained incremental learner of previous instance using the current set of pseudo-labeled utterances and the current instance labeled data corresponding to new input intents to generate a trained incremental learner for current instance; and identify a current plurality of concept words from the current instance labeled data corresponding to new input intents and storing the plurality of concept words in a replay memory for generation of the pseudo-labeled utterances in successive joint training of incremental learner.

6. The system of claim 5, wherein the total Loss function (L) is mathematically represented as: $L_{total}=\lambda 1 * L_{ID} + \lambda 1 \times L_{KD} + \lambda 2 * L_R + \lambda 3 * L_{SCT}$, wherein $\lambda 1, \lambda 2, \lambda 3$ are set of hyperparameters of the incremental learner.

7. The system of claim 5, wherein the prompt created using the PWQ technique is based on a PWQ prompt function, mathematically represented as:

$$f_{prompt}^{PWQ}(x) = (x, ANS, y, EOS),$$

wherein x is the user utterance, ANS and EOS refers to special tokens used during prompt creation, and y is labeled data.

8. The system of claim 5, wherein the prompt created using the PWIQ technique is based on a PWIQ prompt function, mathematically represented as:

$$f_{prompt}^{PWIQ}(x) = (x, IncQ, ANS, y, EOS),$$

wherein x is the user utterance, ANS, EOS refers to special tokens used during prompt creation, and IncQ at a current instance includes all the intent labels from y labeled data.

9. One or more non-transitory machine-readable information storage mediums comprising one or more instructions which when executed by one or more hardware processors cause:

performing a joint training of an incremental learner implemented via the one or more hardware processors, to obtain a trained incremental learner for LID and a pseudo-labeled utterance generation, wherein the pseudo-labeled utterances refer to synthetic labeled data comprising utterance and intent, wherein the utterance is generated based on prompt based approach, wherein the joint training repeats at regular intervals for new input intent is received, and wherein the plurality of concept words from the new input intent are identified as top-K term frequency-inverse document frequency (tf-idf)) words, wherein a LID problem is modeled as a class Incremental Learning (class IL) problem, and wherein a training objective is to classify a user utterance into one of multiple pre-defined intents by minimizing a total Loss function ($L_{total}$), wherein the total Loss function ($L_{total}$) comprises:

a) a Lifelong Intent Detection (LID) loss function ($L_{ID}$) to train the incremental learner for an intent label generation, wherein the incremental learner generates the intent label corresponding to an input utterance using a prompt-based generative classification approach, wherein no overlap between the intents are generated at different incremental steps, wherein a prompt is created using one of a Prompt without question (PWQ) technique and a Prompt without incremental question (PWIQ) technique;

b) a Labeled Utterance Generation (LUG) loss function ($L_R$) to train the incremental learner for the pseudo-labeled utterance generation, wherein the incremental learner generates the pseudo-labeled utterance for an input intent label of an input prompt using a prompt augmented generative replay approach, wherein the input prompt is created using a LUG prompt function and comprises an input intent and a plurality of concept words from the input intent stored in a memory wherein only storing relevant contexts per intent in the memory and using stored contexts with the class label as prompts for generating intent-specific utterances, thereby eliminating need of volumes of old training data, and reducing memory requirement, speeding up incremental training still enabling not forgetting old intents;

c) a Supervised Contrastive Training (SCT) loss function ($L_{SCT}$) to fine-tune the incremental learner using a valid utterance intent pair (U, I1) and a randomly chosen intent (I2) to predict whether I1 and I2 correspond to a same intent, wherein to minimize the likelihood of incorrect utterance-label pairs during LID and LUG, the trained incremental learner is explicitly trained on positive and negative utterance-label pairs via contrastive loss; and d) a Knowledge Distillation (KD) loss function ($L_{KD}$) to fine-tune the incremental learner to alleviate catastrophic forgetting;

generating by the trained incremental learner of a previous instance, implemented by the one or more hardware processors, a current set of pseudo-labeled utterances;

receiving at a current instance, labeled data corresponding to new input intents by the one or more hardware processor;

iterating by the one or more hardware processors, the joint training of the trained incremental learner of previous instance using the current set of pseudo-labeled utterances and the current instance labeled data corresponding to new input intents to generate a trained incremental learner for current instance; and identifying by the one or more hardware processor, a current plurality of concept words from the current instance labeled data corresponding to new input intents and storing the plurality of concept words in a replay memory for generation of the pseudo-labeled utterances in successive joint training of incremental learner.

10. The one or more non-transitory machine-readable information storage mediums of claim 9, wherein the total Loss function ($L_{total}$) is mathematically represented as: $L_{total} = \lambda 1 * L_{ID} + \Delta 1 * L_{KD} + \lambda 2 * L_R + \lambda 3 * L_{SCT}$, wherein $\lambda 1$, $\lambda 2$, $\lambda 3$ are set of hyperparameters of the incremental learner.

11. The one or more non-transitory machine-readable information storage mediums of claim 9, wherein the prompt created using the PWQ technique is based on a PWQ prompt function, mathematically represented as:

$$f_{prompt}^{PWQ}(x) = (x, ANS, y, EOS),$$

wherein x is the user utterance, ANS and EOS refers to special tokens used during prompt creation, and y is labeled data.

12. The one or more non-transitory machine-readable information storage mediums of claim 9 wherein the prompt created using the PWIQ technique is based on a PWIQ prompt function, mathematically represented as:

$$f_{prompt}^{PWIQ}(x) = (x, IncQ, ANS, y, EOS),$$

wherein x is the user utterance, ANS, EOS refers to special tokens used during prompt creation, and IncQ at a current instance includes all the intent labels from y labeled data.

\* \* \* \* \*